United States Patent [19]

Mauldin

[11] 3,991,979
[45] Nov. 16, 1976

[54] SAFETY LOCK FOR A HOISTING MECHANISM THAT ASCENDS AND DESCENDS A CABLE

[75] Inventor: William E. Mauldin, Cincinnati, Ohio

[73] Assignee: Hi-Lo Powered Stirrups, Inc., Cincinnati, Ohio

[22] Filed: Oct. 30, 1975

[21] Appl. No.: 626,971

Related U.S. Application Data

[62] Division of Ser. No. 540,838, Jan. 14, 1975.

[52] U.S. Cl. ........................... 254/186 R; 254/150 R
[51] Int. Cl.² ............................................ B66D 1/00
[58] Field of Search ................ 254/150 R, 145, 170, 254/186 R, 168; 74/11; 318/107, 51, 441; 82/36 B

[56] References Cited
UNITED STATES PATENTS

| | | | |
|---|---|---|---|
| 3,226,089 | 12/1965 | Patz | 254/145 |
| 3,467,359 | 9/1969 | Durand | 254/186 R |

*Primary Examiner*—Robert J. Spar
*Assistant Examiner*—Kenneth Noland
*Attorney, Agent, or Firm*—Wood, Herron & Evans

[57] ABSTRACT

A novel safety lock that includes an activation device and a latching device, these devices cooperating with the cable that passes through the lock. The activation device includes a guide pulley rotatably fixed to a mounting plate, a spring loaded pressure roller adapted to press the cable into operating engagement therewith, and a series of centrifugally activated arms positioned about the axis of the guide pulley. The latching device includes a lock block fixed to the mounting plate, and a spring loaded lock wheel mounted for eccentric rotation, the lock wheel being adapted to lock the cable against the lock block then activated. A separate release lever pivotally fixed to the mounting plate is spring loaded in one direction, and a separate latch lever pivotally fixed to the mounting plate is spring loaded in an opposite direction, the latch lever having a latch pin adapted to interengage with a seat defined by the release lever when the safety lock is in the set or unactivated position. Also, the latch pin interengages a seat in the lock wheel to retain same in the spring loaded or unactivated attitude. The head of the release arm is disposed relative to the periphery of the centrifugally activated arms such that any outward motion of those arms (e.g., due to centrifugal force induced by a rapid fall of the safety lock down the cable) will cause at least one of the arms to trip the release lever, thereby removing the latch pin from interengagement with the release lever. At this point the spring loaded latch lever removes the latch pin from interengagement with the lock wheel, thereby allowing the lock wheel to rotate and securely grip the cable between the lock wheel and the lock block.

1 Claim, 6 Drawing Figures

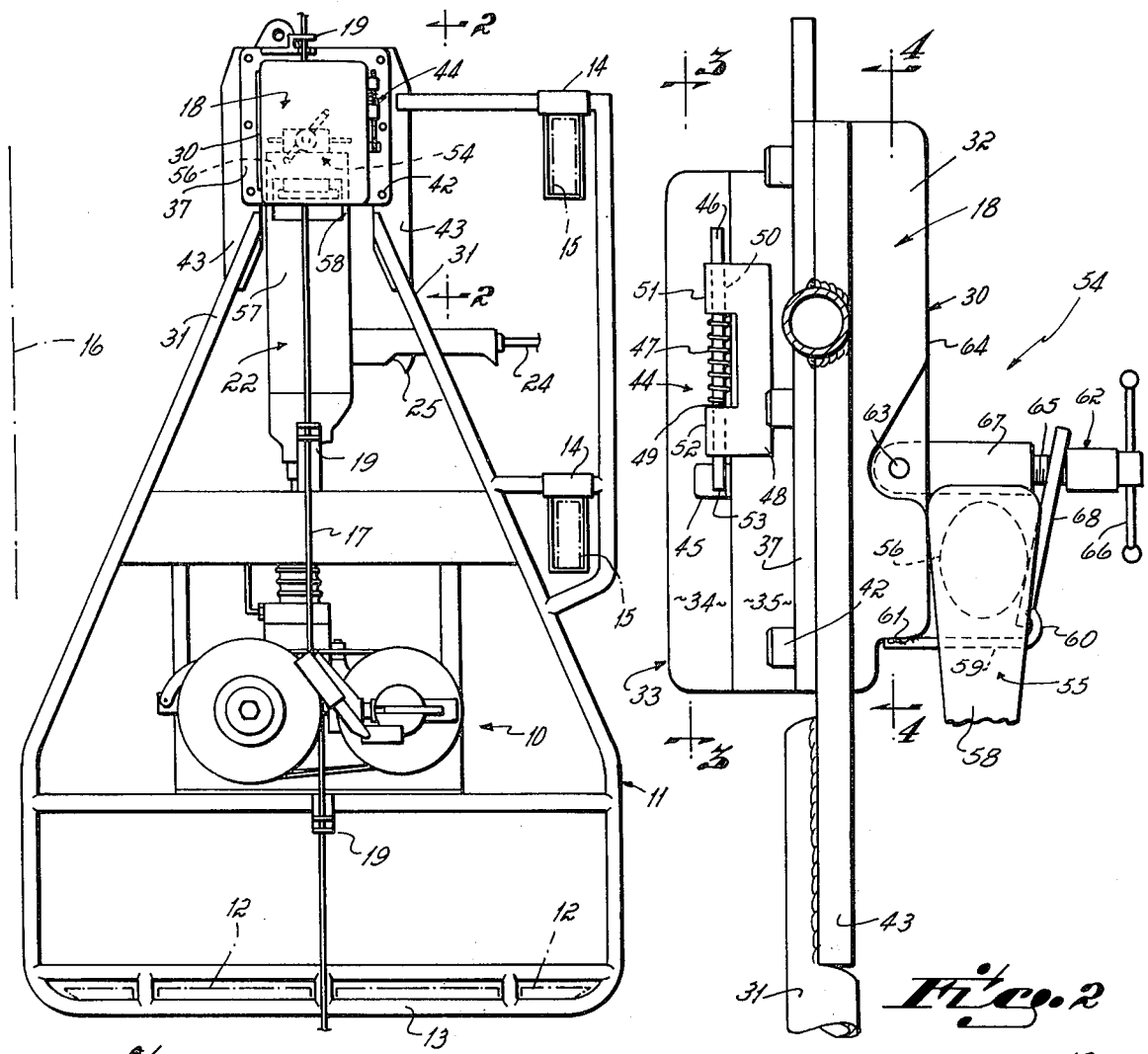
Fig. 1
Fig. 2
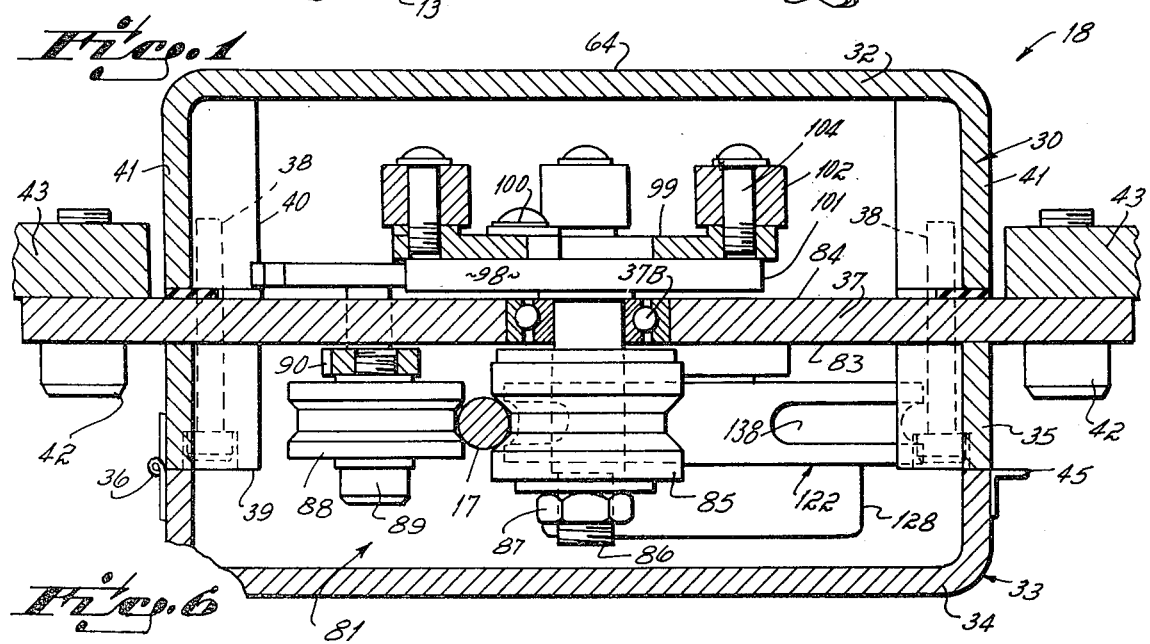
Fig. 6

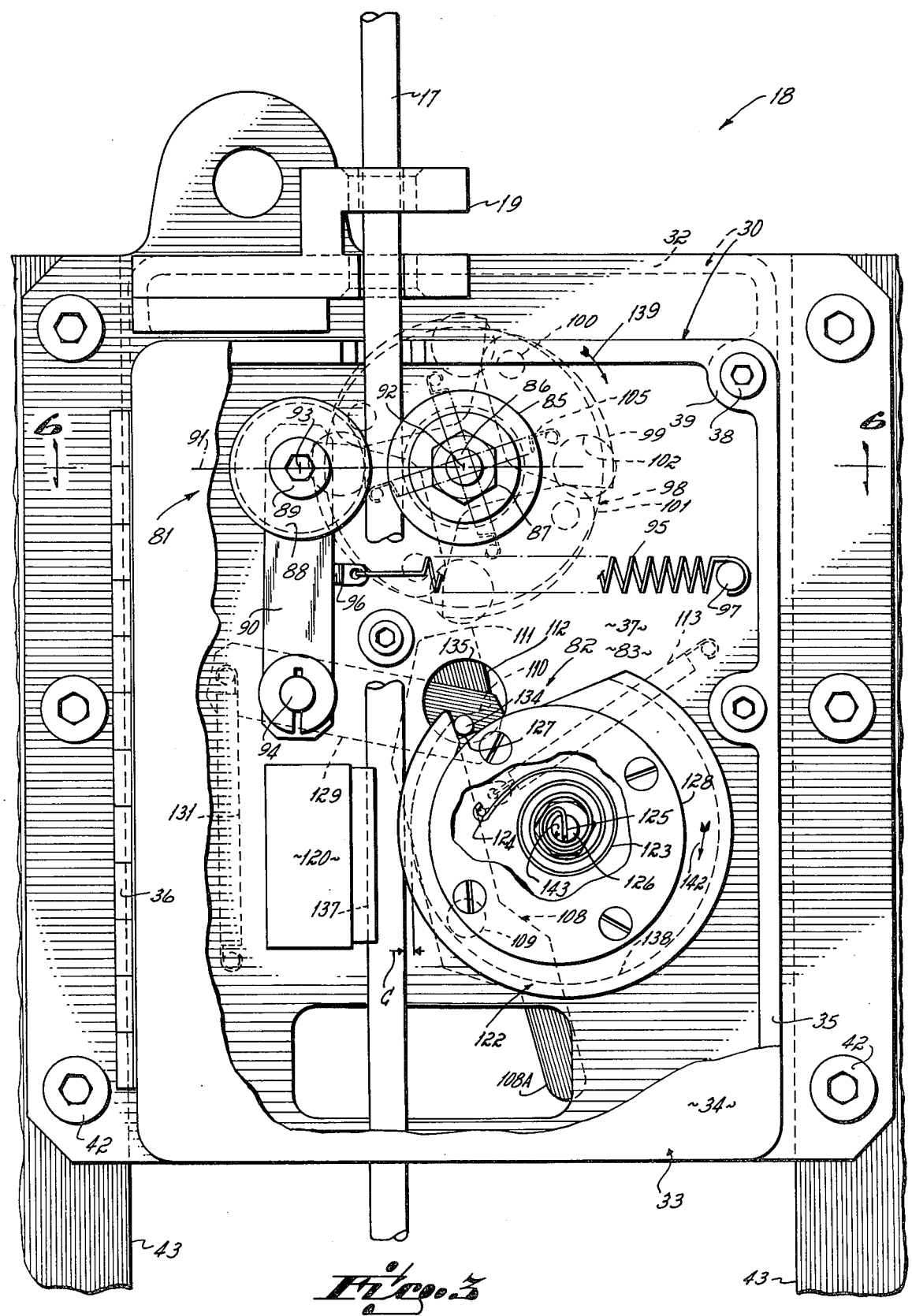

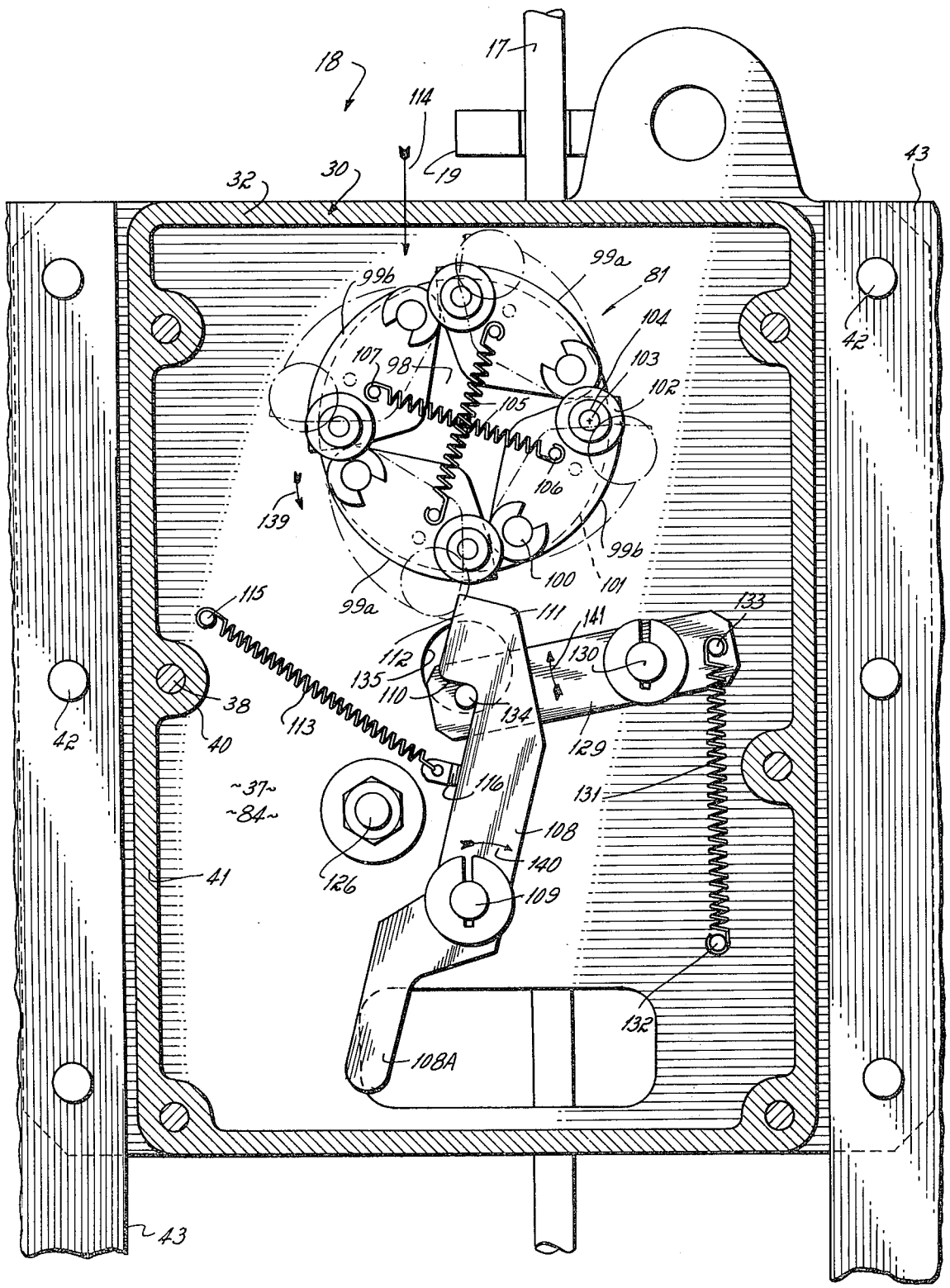

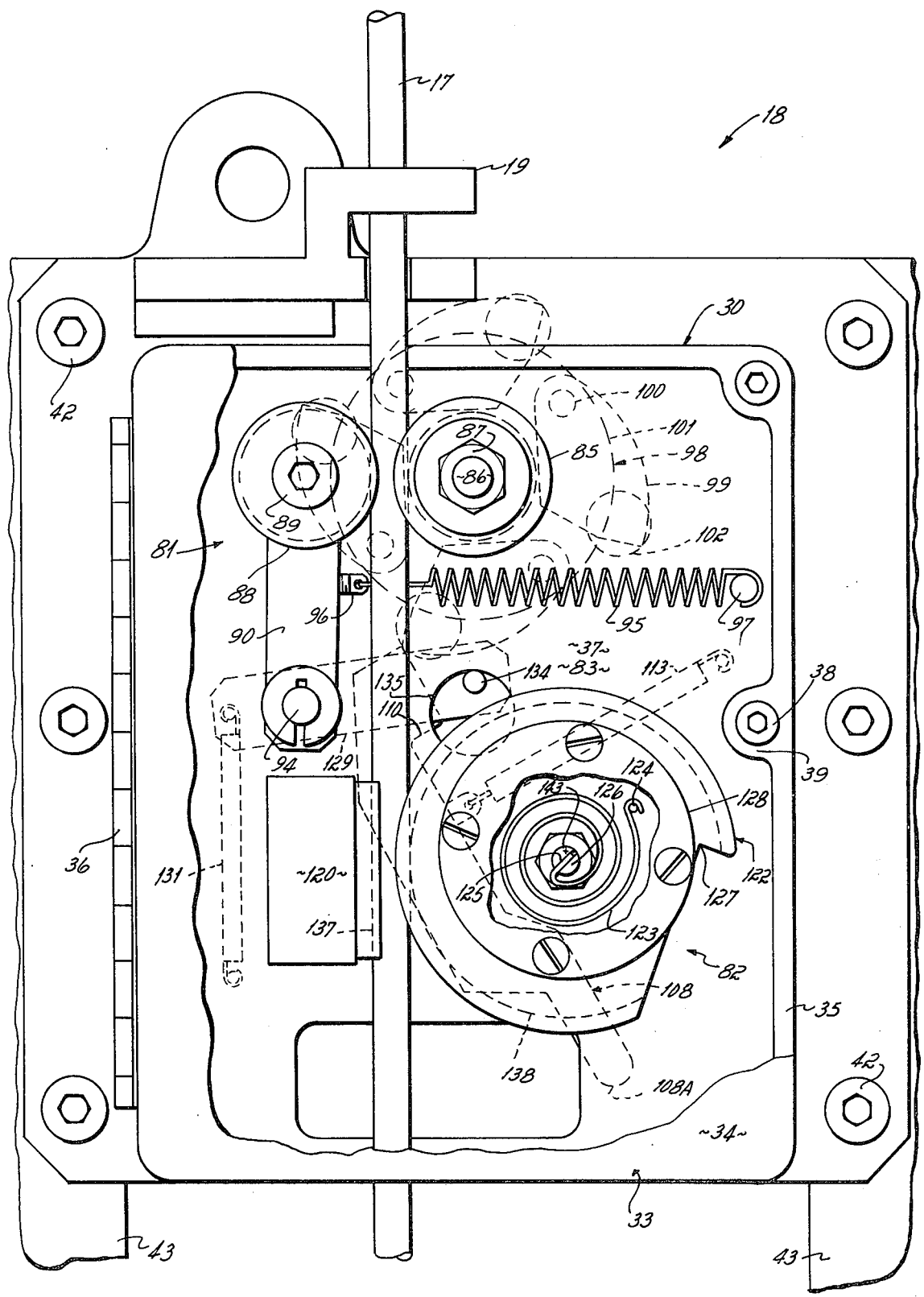

SAFETY LOCK FOR A HOISTING MECHANISM THAT ASCENDS AND DESCENDS A CABLE

This is a division of application Ser. No. 540,838 filed Jan. 14, 1975.

This invention relates to safety locks. More particularly, this invention relates to a specific safety lock structure for a hoisting mechanism that ascends and descends a cable.

Swing stage or free hanging scaffolds are customarily used in construction, repair and painting work for raising and lowering workers along the face of a building or the like. More recently, such swing stage scaffolds have found wide use in connection with washing windows of high-rise or skyscraper type buildings. In such instances a scaffold may be supported between two hoisting mechanisms, i.e., a hoisting mechanism is positioned at each end of the scaffold, and the mechanisms operated in tandem to raise and lower the scaffold. Also, during construction of a building elevator cages are customarily used for moving men and materials from ground level to upper floors of that building. A single hoisting mechanism is often used for raising and lowering such elevator cages.

In the case of swing stage scaffolds and/or elevator cages adapted for use with such hoisting mechanisms, the hoisting mechanism may be of the type having a power driven sheave or pulley system through which a freely hanging, single strand of cable is threaded. This cable is suspended from an overhead support. When the mechanism's sheave or pulley system is power driven in one direction the mechanism climbs the cable, and when the mechanism's sheave system is driven in the opposite direction the mechanism descends the cable.

Power driven hoisting mechanisms of the type particularly adapted for ascending and descending a freely hanging, single strand of cable are well known to the prior art. Such hoisting mechanisms are shown, for example, in Mauldin U.S. Pat. No. 3,794,298; Mauldin U.S. Pat. No. 3,276,745; Allenbaugh U.S. Pat. No. 2,938,707, and Allenbaugh U.S. Pat. No. 2,662,734. These hoisting mechanisms are all particularly adapted for use with swing stage scaffolds and elevator cages of the type described above. The hoisting mechanism structures taught by these patents each incorporate an open breach type of power driven sheave or pulley system so that that system can be easily threaded or unthreaded with the single strand of cable when the hoisting mechanism is resting on the ground. Such an open breach type of sheave system is desirable because the cable can be threaded into the power driven sheave system at any point intermediate its ends, i.e., the cable need not be threaded into the sheave system from one end or the other as if threading a needle.

In addition to the power driven sheave system, each such swing stage scaffold or elevator cage is usually provided with a safety lock through which the freely hanging cable passes. The safety lock functions to quickly grab onto the cable if the scaffold or cage should start to fall relative to ground level due to a malfunction in the sheave system. That is, and immediately upon a malfunction of the sheave system that would normally allow rapid descent of the scaffold or cage but for the safety lock, the safety lock functions to keep that scaffold or cage from falling to ground level, thereby preventing an accident. One type of safety lock structure for use with sheave systems as disclosed in the patents cited above, and which has seen commercial use over the years, is illustrated in Allenbaugh U.S. Pat. No. 2,931,466.

Industrial safety has been receiving greater attention in recent years, to wit: the Occupational Safety and Health Act, commonly known as OSHA. In the operating environment of swing stage scaffold and elevator cage products, the safety lock structure which is used to keep the scaffold or cage from falling to ground level, in the event of a hoisting mechanism malfunction, is of great importance in the prevention of accidents. With particular reference to a safety lock structure for such swing stage scaffolds and elevator cages, it is highly desirable that the safety lock structure activate as very quickly as possible once the scaffold or cage starts to fall to ground level if malfunction should occur. In other words, the safety lock should function substantially simultaneously with a hoisting mechanism or other malfunction to prevent the scaffold or cage from falling a substantial distance relative to its original location on the cable. Under operating or use conditions, a fall of the scaffold or cage for a substantial distance may cause a serious accident to occur even if the scaffold or cage does not fall all the way down to ground level.

Thus, it has been the primary objective of this invention to provide an improved safety lock structure for use with a power driven hoisting mechanism of the type particularly adapted for ascending and descending a freely hanging single strand of cable. This novel safety lock structure is adapted to activate substantially simultaneously upon the hoisting mechanism being exposed to a free fall relationship relative to the cable with which it is operatively connected.

The objective of this invention is accomplished by providing a safety lock structure that includes an activation device and a latching device, these devices cooperating with the cable that passes through the lock. The activation device includes a guide pulley rotatably fixed to a mounting plate, a spring loaded pressure roller adapted to press the cable into operating engagement therewith and a series of centrifugally activated arms positioned about the axis of the guide pulley. The latching device includes a lock block fixed to the mounting plate and a spring loaded lock wheel mounted for eccentric rotation, the lock wheel being adapted to lock the cable against the lock block when activated. A separate release lever pivotally fixed to the mounting plate is spring loaded in one direction, and a separate latch lever pivotally fixed to the mounting plate is spring loaded in an opposite direction, the latch lever having a latch pin adapted to interengage with a seat defined by the release lever when the safety lock is in the set or unactivated position. Also, the latch pin interengages a seat in the lock wheel to retain same in the spring loaded or unactivated attitude. The head of the release arm is disposed relative to the periphery of the centrifugally activated arms such that any outward motion of those arms (e.g., due to centrifugal force induced by a rapid fall of the safety lock down the cable) will cause at least one of the arms to trip the release lever, thereby removing the latch pin from interengagement with the release lever. At this point the spring loaded latch lever removes the latch pin from interengagement with the lock wheel, thereby allowing the lock wheel to rotate and securely grip the cable between the lock wheel and the lock block.

Other objectives and advantages of this invention will be more apparent from the following detailed description taken in conjunction with the drawings in which:

FIG. 1 is a general side elevational view schematically depicting a swing stage scaffold's hoisting mechanism in combination with the improved safety lock structure of this invention;

FIG. 2 is a cross-sectional view taken along line 2—2 of FIG. 1;

FIG. 3 is a cross-sectional view taken along line 3—3 of FIG. 2 showing the safety lock structure in the set or unactivated attitude;

FIG. 4 is a cross-sectional view taken along line 4—4 of FIG. 2 also showing the safety lock in the set or unactivated attitude;

FIG. 5 is a view similar to FIG. 3 but showing the safety lock in the activated or locking attitude; and FIG. 6 is a cross-sectional view taken along line 6—6 of FIG. 3.

Referring to the drawings, in the general side elevational view of FIG. 1 there is shown a hoisting mechanism 10 (that is a power driven sheave system) mounted on an A-shaped stirrup or frame 11; such is particularly adapted for use with a swing stage scaffold. Under normal use conditions with a swing stage scaffold, two such hoisting mechanism 10-stirrup 11 structures are used with one being located at each end of scaffold planks 12 for raising and lowering that scaffold relative to ground level. The A-shaped stirrup 11 includes a scaffold support member 13 on which one end of the scaffold planks 12 rest, and brackets 14 which receive back rest boards 15. The scaffold planks 12, of course, are for standing on by workmen, and the back rest boards 15 are for preventing the workmen from falling backwards off the scaffold as they do the job required on the building face 16 or other work surface.

A freely hanging single strand of cable 17 provides vertical support to each hoisting mechanism 10, and to the stirrup 11, the cable being fixed to and extending from an overhead support (not shown). The cable 17 is threaded in operative engagement with the hoisting mechanism and extends from the top to the bottom of the stirrup 11, the mechanism 10 being adapted to climb up and down the cable so as to raise and lower the stirrup relative to ground level. A safety lock 18 for the cable 17, and in accord with the principles of this invention, is mounted at the apex or top of the stirrup. Cable guides 19 fixed to the stirrup 11 are located above the safety lock 18, between the safety lock and the hoisting mechanism 10, and below the hoisting mechanism, to assist in guiding the cable into and out of the safety lock and into and out of the hoisting mechanism, (i.e., into and out of the power driven sheave system), as the mechanism ascends and descends the cable.

The hoisting mechanism 10, which is more particularly described in Mauldin U.S. Pat. No. 3,794,928, is operated by a power unit 22, e.g., a heavy duty drill, fixed to the stirrup 11. The heavy duty drill unit 22 is electrically energized through lead 24, the unit being operated by a finger trigger switch 25. A reversing switch (not shown) on the power unit 22 allows the hoisting mechanism 10 to be driven clockwise or counterclockwise, thereby allowing the mechanism to be positively driven both in its ascent up the cable 17 and its descent down the cable. Therefore, it is by means of the hoisting mechanism 10 itself, as driven by the power unit 22, that the stirrup frame 11 (and hence the swing stage scaffold) ascends and descends the freely hanging cables 17.

The safety lock 18 of this invention is more particularly illustrated in FIGS. 2–6. As shown in FIGS. 2 and 6, the safety lock includes a housing 30 adapted to be mounted on angulated side arms 31 of the A-frame structure 11. The safety lock housing 30 includes a pan-shaped rear housing member 32 and a pan-shaped front housing member 33, the front housing including a door 34 hingedly connected to oval frame 35 by hinge 36. The front housing 32 and the rear housing 33 are interconnected one with the other, and are subdivided one from the other, through support plate 37. Bolts 38 cooperate with bored seats 39 formed integral with the front housing frame 35, and with bore seats 40 formed integral with the rear housing member 32, in fixing the front 33 and rear 32 housings to that support plate, the support plate extending beyond the side walls 41 of the housing 30. The support plate itself is fixed by bolts 42 to mounting brackets 43 that are disposed on each side thereof, thereby mounting the housing members 32, 33 to those brackets 43. The mounting brackets 43 are fixed, e.g., welded, to the angulated side pieces 31 of the A-frame 11, thereby fixing the safety lock 10 structure in place relative to the A-frame.

Also as is illustrated in FIGS. 2 and 6, the door 34 of the safety lock 10 structure is provided with a door latch 44 by which same is restrained in the closed attitude during operation of the hoisting mechanism, and by which same is accessible to an operator during initial threading of the cable 17 through the lock as well as during resetting of the lock. The door latch 44 includes a strike plate 45 fixed to the door 34, and a bolt 46 fixed to the frame 35 of the front housing 33. The bolt 46 is spring 47 loaded in bracket 48 fixed to the front housing frame 35, the compression spring being fixed to the bolt at the lower end as at 49. The bolt 46 is slidably received in bores 50 defined by the head 51 and foot 52 of the bracket 48, thereby spring loading the bolt downward as shown in FIG. 2. In the latching attitude, the bottom portion 53 of the bolt 46 overlies the strike plate 45 fixed to the front housing's door 34, thereby holding the door closed.

Further, as is shown in FIG. 2, the rear housing 32 of the safety lock 10 structure carries a fastener device 54 which is adapted to cooperate with handle 55 of the drill 22 which serves as the power unit for the hoisting mechanism 10. This fastener device 54 interacts with the handle's handgrip bar 56, that handgrip bar being interconnected with the drill's housing 57 by handle bracket 58. The fastener device 54 includes a hook 59 fixed to the rear housing that provides an upwardly curved finger 60 at its exposed or outer end, the hook being, e.g., welded, to the rear housing 32 as at 61. The fastener device 54 also includes a securing mechanism 62 pivotally connected as at 63 to the rear housing 32 intermediate its rear face 64. The securing mechanism 62 includes a threaded bolt 65 having a cross handle 66 fixed thereto at one end, the bolt being received within a threaded coupling 67 pivotally fixed to the rear housing's face 64 as at pivot point 63. A trap plate 68 is interposed on the threaded bolt 65 between the handle 66 and the threaded coupling 67, the trap plate being of a length to cooperate with the outwardly curved finger 60 on the hook 59 so as to secure the handgrip bar 56 of the drill 22 between that trap plate and the housing's rear face 64 as the handle is tightened relative to the coupling. Thus, such provides a fastener device 54 by means of which one end of the power drive unit 22, i.e., the drill, may be fixedly secured in operating position relative to the A-frame 11 itself.

The operating mechanism of the safety lock of this invention is particularly illustrated in FIGS. 3–6. The operating mechanism is basically divided into two separate parts, namely, the activation mechanism 81 and the locking mechanism 82. Each of the activation mechanism 81 and the locking mechanism 82 is mounted to the mounting plate 37 of the safety lock structure, a portion of each mechanism being provided on the front side 83 and on the rear side 84 of the mounting plate for ease of assembly and use.

The activation mechanism 81 of the safety lock structure includes, as shown in FIGS. 3–6, a guide pulley 85 disposed on the front side 83 of the support plate 37, the guide pulley being fixed on shaft 86 by nut 87 as shown in FIG. 6. The shaft 86 (and hence the guide pulley 85) is journalled for rotation on bearings 37B carried in the support plate 37. A pressure roller 88 is rotatably journalled to a shaft 89, the shaft 89 being fixed to pressure roller arm 90. The pressure roller 88 is disposed relative to the guide pulley 85 such that a phantom line 91 drawn between the axes 92, 93 of the pressure roller and the guide pulley, respectively, is substantially transverse to the orientation of the cable 17 that passes therebetween, see FIG. 3. The pressure roller arm 90 is pivotally mounted to the support plate 37 on pin 94 and is spring 95 loaded toward the guide pulley at all times, the spring being fixed at one end to the pressure roller arm as at 96 and at the other end to the support plate as at 97.

The guide pulley shaft 86, as noted, is carried in bearings 37B and extends through the support plate where an activator plate 98 is fixed to same, compare FIGS. 3, 4 and 6. This activator plate 98 carries four centrifugally activated arms 99 which are each pivotally mounted as at 100 adjacent the outer periphery 101 of that activator plate, see FIG. 4. Each centrifugally activated arm 99 includes a weight in the form of a roller 102, each roller being mounted to its respective arm at the end thereof opposite to the pivotal interconnection 100 of that arm with the activator plate. Each roller is adapted to rotate about rotational axis 103 defined by pins 104 fixed to the centrifugally activated arm 99. Opposed centrifugally activated arm pairs 99a and 99b (two such pairs being shown) are spring biased toward one another by a diametrically positioned spring 105 fixed at one end 106 to one arm and fixed at the other end 107 to the other arm. The centrifugally activated arms 99 are adapted to pivot outwardly from the solid line or non-activated position illustrated in FIG. 4 into the phantom line or locked activated position also illustrated in FIG. 4.

The activation mechanism 81 also includes, as illustrated in FIG. 4, a release lever 108 pivotally mounted to the support plate 37 on pivot pin 109, the release lever defining a seat 110 at the top end 111 thereof and being provided with a forehead 112 (also at the top end thereof) which is positioned so as to be struck by the weighted rollers 102 on the centrifugally activated arms 99 when those arms fly outwardly into the phantom line position shown in FIG. 4. The release lever 108 is spring 113 loaded in a direction the same as the rotational direction of the activator plate 98 as the safety lock moves down the cable 17 in the direction shown by arrow 114, the release lever 108 being illustrated in FIG. 4 as spring loaded in the counterclockwise direction and the activator plate also being adapted to rotate in the counterclockwise direction as the safety lock moves down the cable 17. The release lever 108 also includes reset toe 108A, the purpose of which is described in detail below. The release lever's spring 113 is fixed to the support plate 37 95 at 115 and fixed to the latch lever as at 116.

The lock mechanism 82 of the safety lock 10 of this invention is also particularly illustrated in FIGS. 3–5. The lock mechanism 82 includes immobile lock block 120 bolted or otherwise fixedly secured to the support plate 37 on one side of the cable 17. Opposite the lock block 120, and on the other side of the cable 17 which passes therebetween, is disposed a lock wheel 122 journalled for rotation on shaft 126 fixed to the support plate 37, see FIGS. 3, 4 and 6. The lock wheel 122 includes a coil spring motor 123 interiorly thereof, the spring motor being fixed at one end as at 124 to the rotating wheel 122 and being fixed at the other end as at 125 to the lock wheel shaft 126. The spring motor 123 is disposed relative to the lock wheel 122 such that, as shown in FIG. 3, same will cause the lock wheel to rotate in the clockwise direction when the safety lock 10 is activated. The lock wheel 122, as particularly shown in FIG. 3, includes a latch seat 127 defined by a cord cut therefrom and a reset hub 128 for resetting the lock wheel's spring motor 123 after same has been activated. The lock wheel 122 is eccentrically mounted relative to the lock block 120, i.e., in the set or unactivated position, as shown in FIG. 3, a distinct clearance C is provided between the periphery of the lock wheel and the cable when the cable passes between the lock wheel and guide block, and in the activated or locking attitude illustrated in FIG. 5 the lock wheel has been rotated so that that clearance disappears and the cable is bound up between the lock wheel and guide block.

The lock mechanism 82 also includes a latch lever 129 pivotally mounted on pin 130 fixed to the support plate 37, the latch lever being spring loaded by spring 131 fixed at one end 132 to the support plate and at the other end 133 to the latch lever. A set pin 134 is fixed to the latch lever on that end opposite to the end 133 at which the spring 131 is attached. The set pin 134 extends from both sides of the latch lever 129 and extends through port 135 in the support plate 37 into operating proximity with the lock wheel 122. The latch lever 129 is sized so that set pin 134 may seat in the latch seat 127 of the lock wheel 122 so as to hold the lock wheel in the set or unactivated attitude as illustrated in FIG. 3. In this set or unactivated attitude, the set pin 134 of the latch lever 129 is also positioned such that the seat 110 defined by the release lever 108 also receives the set pin 134 to preclude counterclockwise motion of the release lever from the set or unactivated position illustrated in FIG. 4.

In use, the set or unactivated position of the safety lock 10 is particularly illustrated in FIGS. 3 and 4. To set the safety lock into this set or unactivated attitude, the door 34 to the front housing 33 is first opened by releasing the door latch 44. By grasping reset hub 128, the lock wheel 122 is then rotated against the normal bias of the spring motor 123 until it achieves that general operational position illustrated in FIG. 3. At that position, the latch lever 129 is drawn down to the FIG. 3 position (against the bias of spring 131) by grasping set pin 134 fixed to that lever since the set pin extends through port 135 in the support plate 37. The release lever 108 (to which access is available through finger port 136 at the bottom of the support plate 37) is then oriented against the bias of spring 113 through use of reset toe 114 so that its seat 110 can also rest against the latch lever's set pin 134. In this set or unactivated attitude, therefore, there is a substantial clearance C between the lock block's grip surface 137 and the lock wheel's periphery 138 to permit free and unhindered passage of the cable 17 between those two locking surfaces, the lock wheel being retained in this set attitude by set pin 134. The cable 17, of course, can only be threaded or laid in place between the guide block 120 and the lock wheel 122 when the lock 10 structure is in the set or unactivated attitude.

In this set or unactivated attitude, the cable 17 is also threaded or disposed between the pressure roller 88 and the guide pulley 85, the pressure roller simply being pivoted away from the guide pulley against spring 95 until the cable is laid therebetween. Thus, note that the lock 10 structure is an open breach type structure that may be readily threaded and reset from the front side 83 of the support plate 37 simply by opening front door 33.

In use, the pressure roller 88 is continuously pressed into operating relationship against the cable 17 by spring 95, thereby continuously pressing the cable into operational relation with guide pulley 85. Therefore, as the cable 17 proceeds through the safety lock 10, and assuming that the A-frame 11 is being lowered on the cable 17 by the hoisting mechanism 10, the guide pulley 85 is rotated in the direction of arrow 139 by virtue of its contact with the cable. The safety lock 10 retains the set or unactivated attitude described in the paragraphs immediately above until and unless the cable starts to pass through the safety lock 10 quite quickly such as might occur in the case of failure of the drive system 10; such would, of course, tend to make the entire scaffold fall relative to the cable. When this situation obtains, the guide pulley 85 rotation speeds up substantially, thereby swinging the centrifugally actuated arms 99 against the bias of springs 105 from the set position illustrated in solid lines in FIG. 4 to the activated or phantom line position illustrated in FIG. 4. As the centrifugally activated arms 99 reach the phantom line position, one of the roller weights 102 will strike the release lever's forehead 112, thereby knocking same in the direction of arrow 140 as shown in FIG. 4. This will remove the release lever's seat 110 from seating engagement with the latch lever's set pin 134, thereby permitting the latch lever to pivot in the direction of arrow 141 under normal bias of spring 132. As the latch lever 129 pivots, such removes the set pin 134 from latching relation with the lock wheel 122. When this situation obtains, the spring motor 123 in the lock wheel 122 rotates the lock wheel in the direction of arrow 142. This causes the cable 17 to be securely gripped between the lock surfaces 138, 137 of the lock wheel 122 and the guide block 120, respectively, since the lock wheel is itself eccentrically mounted (on center line 143) relative to the lock block. Further, and because the spring motor 123 in the lock wheel 122 drives the lock wheel clockwise, the greater the downward force applied on the lock 10 structure (i.e., the greater the downward force provided on the swing stage scaffold), the greater the locking force generated on the cable 17 between the lock block 120 and the lock wheel 122.

Of course, once the safety lock 10 structure of this invention has been activated, same is then deactivated and reset in accord with the procedure discussed above once the trouble which caused the initial activation has been solved.

Having described in detail the preferred embodiment of my invention, what I desire to claim and protect by Letters Patent is:

1. A fastener device for a hand drill type power unit on a hoisting mechanism that ascends and descends a cable, said hoisting mechanism including a frame structure to which said hand drill is secured in operational relation, said fastener device including
    a hook shaped plate fixed to said frame structure, said plate being positioned so that the hand grip bar of said drill may overlie said hook shaped plate,
    a securing mechanism adapted to cooperate with said hook shaped plate to restrain said hand drill against said frame structure, said securing mechanism including a threaded coupling pivotally connected to said frame structure and adapted to overlie said hand grip bar on the other side thereof from said hook shaped plate,
    a handle member threadedly engaged with said coupling, and
    a trap plate interposed between said handle member and said coupling, said trap plate being sized to interconnect with said hook plate when said coupling is positioned to overlie the hand grip bar, said trap plate forcing said hand grip bar against said frame structure when said handle is threaded into said coupling, thereby aiding in restraint of said hand drill in the desired operational position on said frame structure.

* * * * *